US010706706B2

(12) United States Patent
Dempsey

(10) Patent No.: US 10,706,706 B2
(45) Date of Patent: Jul. 7, 2020

(54) SYSTEM TO DETERMINE EVENTS IN A SPACE

(71) Applicant: Caduceus Wireless, Inc., Boxborough, MA (US)

(72) Inventor: Michael K. Dempsey, Westford, MA (US)

(73) Assignee: Caduceus Wireless, Inc., Boxborough, MA (US)

( * ) Notice: Subject to any disclaimer, the term of this patent is extended or adjusted under 35 U.S.C. 154(b) by 0 days.

(21) Appl. No.: 15/978,839

(22) Filed: May 14, 2018

(65) Prior Publication Data

US 2019/0130725 A1   May 2, 2019

Related U.S. Application Data

(63) Continuation-in-part of application No. 15/007,693, filed on Jan. 27, 2016, now abandoned.

(51) Int. Cl.
*G08B 21/04* (2006.01)
*G06K 9/00* (2006.01)
(Continued)

(52) U.S. Cl.
CPC ....... *G08B 21/043* (2013.01); *G06K 9/00335* (2013.01); *G06K 9/00342* (2013.01); *G06K 9/00369* (2013.01); *G06K 9/00771* (2013.01); *G08B 5/36* (2013.01); *G08B 7/06* (2013.01); *G08B 13/1672* (2013.01); *G08B 19/00* (2013.01); *H04N 5/33* (2013.01); *H04R 1/406* (2013.01); *H04R 3/005* (2013.01); *H04R 3/12* (2013.01)

(58) Field of Classification Search
CPC ........ G08B 21/043; G08B 7/06; G08B 19/00; G08B 13/1672; G08B 5/36; G06K 9/00369; G06K 9/00335; G06K 9/00771; G06K 9/00342; H04R 1/406; H04R 3/12; H04R 3/005; H04N 5/33
USPC ........................................................ 348/143
See application file for complete search history.

(56) References Cited

U.S. PATENT DOCUMENTS 6,215,404 B1 * 4/2001 Morales ........... G08B 13/19656
340/531
2007/0177166 A1 * 8/2007 Habets ..................... G06T 7/62
358/1.2

(Continued)

*Primary Examiner* — Allen C Wong

(57) ABSTRACT

A system and a method for detecting and determining predetermined conditions related to a human occupant in a predetermined space includes one or more microphones for receiving sounds from within the predetermined space, and for transmitting received sounds to a received sound processor. The received sound processor is responsive to the received sounds, for determining at least one predetermined condition related to human occupant in the predetermined space. The system may further include an imager, a rangefinder, a calibration factor and a processor. Images are taken of a space and corrected based on the appropriate calibration factor based on the output of the range-finder. The images are analyzed and compared to characteristics representative of certain events including falls. If the images match the particular characteristics, the system concludes that an event has occurred and outputs this result. An alarm may be generated if the system detects certain events.

16 Claims, 9 Drawing Sheets

(51) Int. Cl.
*G08B 19/00* (2006.01)
*G08B 7/06* (2006.01)
*G08B 13/16* (2006.01)
*G08B 5/36* (2006.01)
*H04N 5/33* (2006.01)
*H04R 1/40* (2006.01)
*H04R 3/12* (2006.01)
*H04R 3/00* (2006.01)

(56) References Cited

U.S. PATENT DOCUMENTS

| | | | |
|---|---|---|---|
| 2011/0087079 A1* | 4/2011 | Aarts | A61B 7/003 600/300 |
| 2013/0184592 A1* | 7/2013 | Venetianer | H04N 7/18 600/476 |
| 2014/0046485 A1* | 2/2014 | Mangaser | B25J 9/1689 700/257 |

* cited by examiner

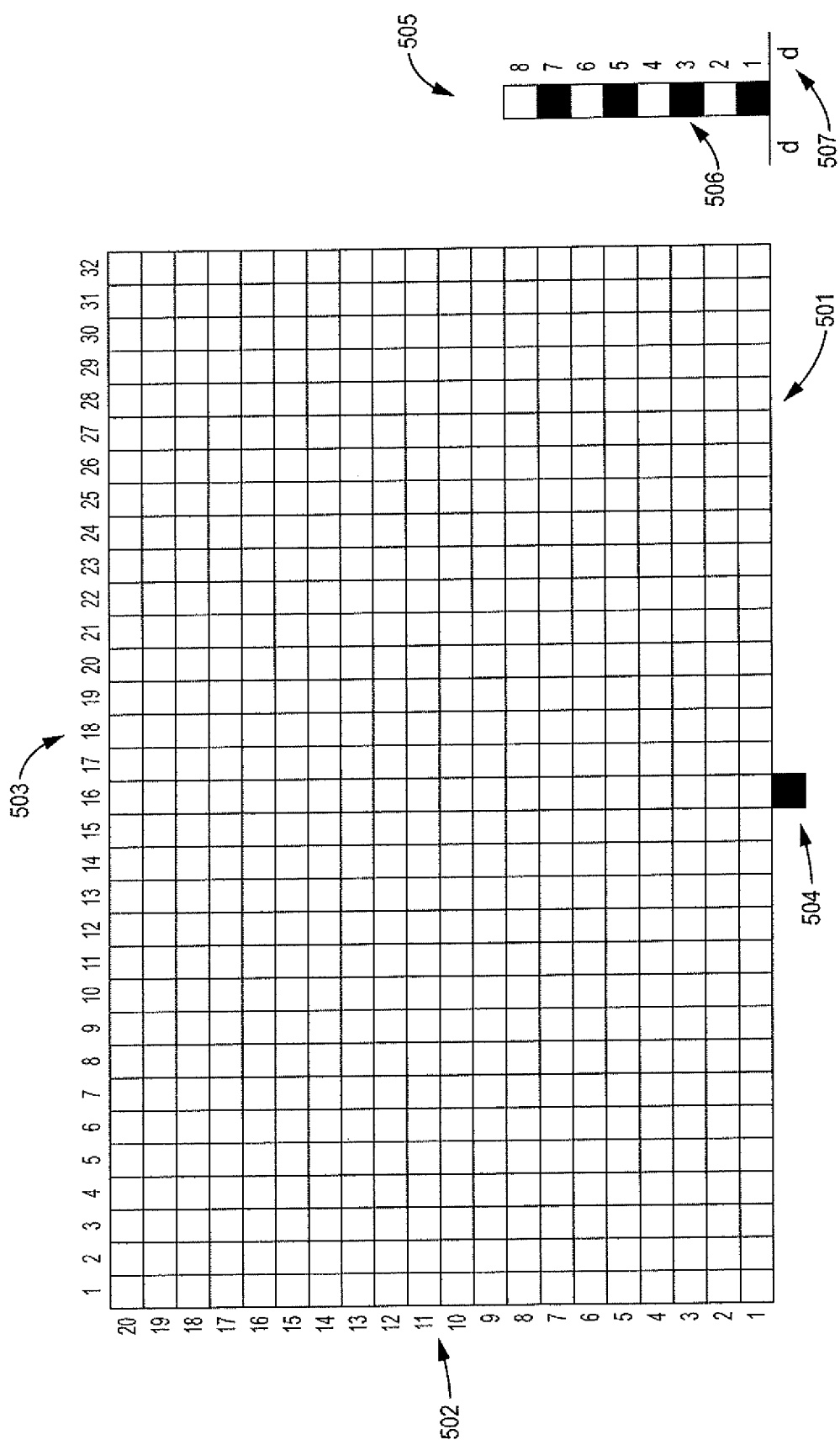
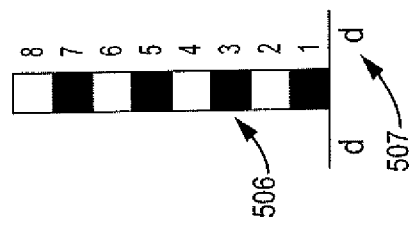
FIG. 5A
FIG. 5B

FIG. 6B

1. If matrix 602 ≠ 0 then event = motion
2. Determine number of moving objects in room
   2.1. Obtain the maximum value of each column in matrix 602 for frame n
   2.2. Is maximum value from all the rows in column(c) > 36"? - call this a max(1)
   2.3. Is maximum value from all the rows in column(c+1) > 36 +/- 3" - this is also max 1
   2.4. Repeat 1-3 so all the maxes are defined
   2.5. If there is more than one max then event = visitors
3. For max(m) = 1, 2...m
   3.1. Determine falls
      3.1.1 Is value in column m in frame n < 24"
         3.1.1.1. If no go to 3.2
         3.1.1.2. If yes, is value in column m in frame n also < 24"? Then event = fall
   3.2. Determine sitting
      3.2.1. Is value in column m in frame n > 48"?
      3.2.2. If not go to 3.3
      3.2.3. If yes, is value in column m in frame n+1 < 48" but > 24"? Then event = sitting
   3.3. Determine standing
      3.3.1. Is value in column m in frame n > 24 but < 48"?
      3.3.2. If not go to 3
      3.3.3. If yes, is value in column m in frame n+1 > 48"? Then event = standing

FIG. 8

SYSTEM TO DETERMINE EVENTS IN A SPACE

CROSS-REFERENCE TO RELATED APPLICATIONS

This application is a continuation-in-part of U.S. patent application Ser. No. 15/007,693 filed on Jan. 27, 2016 entitled "SYSTEM TO DETERMINE EVENTS IN A SPACE" which in turn claims priority from U.S. Provisional Patent application Ser. No. 62/111,710 titled "System To Determine Events In Space", which was filed on Feb. 4, 2015, both of which applications are incorporated fully herein by reference.

TECHNICAL FIELD

The present invention relates to the detection of activity or certain events, such as falls and machine or non-human generated sounds that occur in an arbitrary space such as a living space. More specifically, the present invention relates to a system including one or more sensor types that are configured to receive and analyze images in a room of a home and/or non-human generated sounds to determine if occupants of that room, specifically older occupants, have fallen or participated or not participated in other predetermined events such as sitting, standing or having visitors or if such occupants exhibit a change in pattern that might indicate a health condition such as heart failure or increased dementia.

BACKGROUND INFORMATION

The global trend of an aging populace is well known. This creates a challenge in caring for these older people while still respecting their independence and privacy. "Aging-in-place" attempts to enable older people to live in their own homes as long as practical. It should be no surprise that 89% of elders want to stay in their own homes, and from both a personal and a societal perspective aging-in-place is considerably less expensive. However, aging-in-place can also put elders at risk, especially if they live by themselves; as of 2014 approximately 30% of the 40M community-dwelling elders, or about 12M people, live alone. One of the biggest risks to older people living by themselves is falls.

Falls are a leading cause of injury and death for older people. From an individual perspective, one-in-three people over 65, or 14.7M people, fall each year resulting in 2.4M emergency department visits, 722,000 hospitalizations and 22,900 deaths. Even minor falls can result in significant changes in independence. Up to 75% of patients who fall do not recover their pre-fall level of function. If an elder has fallen once, there is a 60% chance they will fall again within a year. Over one half of elders who fall are unable to get up without assistance and they are more likely to suffer additional complications and poorer prognoses. Patients who had fallen at home but were found in less than one hour had a total mortality of 12% but patients who had been helpless for more than 72 hours had a mortality rate of 67%. From a societal perspective, the cost of care for falls in 2012 was about $30B and, given the growing elder population, is anticipated to reach $67.7 billion by the year 2020. Older people fear moving to a nursing home or losing their independence more than they fear death. Unfortunately, for people living alone, a fall can lead to many hours of pain and helplessness on the floor until someone happens to discover them.

In addition to falls, there are other events that may be of interest to those caring for older people who live by themselves. The elder's general level of activity and social interaction is important, especially for people who have congestive heart failure—less activity means they are getting sicker or a potential increase in cognitive decline (dementia/Alzheimer's). Knowing how much a person sleeps, talks on the phone, receives visitors, uses the computer, uses the bathroom etc. can be a predictor of certain illnesses. Knowing if the elder has left the house, or has unanticipated visitors, is important for people with dementia. Unusual toileting patterns are a leading indicator of certain illnesses, especially urinary tract infections.

One may generalize relevant events into three categories. Emergent events (such as falls) needing immediate attention; safety events (such as when a demented person leaves the house) that also requires immediate attention; habitual events (such as sleep patterns, use of the telephone, computer and bathroom or the sound of a doorbell ringing meaning a visitor is present) don't require immediate intervention but are useful for looking at long-term patterns of disease progression. The system described here attempts to provide caregivers timely data on all three of these event categories.

Ideally, since systems to enable aging-in-place are installed in people's homes, they should be as non-obtrusive as possible. It should not require the older person to wear anything or change their lifestyle in any way.

The aging population along with its accompanying desire and challenge of enabling aging-in-place have been apparent for many years, and hence there have been many prior art attempts to develop system that address this concern.

The simplest and most common prior art solution to the detection of emergencies among the elderly is not a true detection system, but rather simply employs a "panic button". Systems of this type are often called Personal Emergency Response Systems (PERS), and are provided by companies such as Philips LifeLine, Framingham, Mass. If a person has fallen or otherwise needs help, they push a button on a transmitter that is worn around their neck or on their wrist. This transmitter sends a radio signal to a receiver/speaker-telephone, which is plugged into the telephone line. The reception of the radio signal causes the receiver/speaker-telephone to call a preprogrammed telephone number of a response center, where the phone is answered by an operator. The operator can then use the speaker-telephone to ask the victim if they need help. It should be noted that these systems do not generally provide any event data related to habitual or safety events; they are focused on emergent events. Even then, the obvious and significant limitations of this approach include: (i) the need for the elderly person to push the button, which may be difficult if the person is unconscious or has dementia so forgets the button; (ii) the elderly person must always have the button within reach (even at night); (iii) the button/transmitter must be within radio range of the receiver/speaker-phone; and (iv) many elderly people do not enjoy wearing the button.

Another prior art approach is to have a potential fall victim wear an accelerometer. This accelerometer is tuned such that if the person wearing the device falls down, the accelerometer detects the force of impact and sends a radio signal to a similar receiver/speaker-phone as described above. There are many variations on this theme in the art. An example of this type includes a system which describes a fall-sensor accelerometer that is integrated into a mobile phone. Commercial products based on the accelerometer approach are offered by Philips Lifeline (Framingham, Mass.) and Tunstall (Yorkshire, UK). Systems of this type primarily attempt to overcome historically significant limitations such as false alarms generated when the patient sits or lays down abruptly. However, none of the prior art overcomes the fundamental flaw in the approach that the potential fall victim must wear the device on their person constantly—even at night. Other limitations include (i) the relatively high rate of false alarms generated from normal activities of daily living (ADL) or having the sensing accelerometer accidentally drop to the floor; (ii) the relatively high cost of such a device; (iii) like the PERS above, the sensing device must be within radio range of the receiver/speaker-phone; and, similar to the PERS, (iv) many elderly patients do not enjoy wearing the accelerometer.

Yet another prior art solution is a whole-house monitoring system or "Smart Home." Prior art systems of this type have the potential to indirectly address the problem of fall detection by determining if the elder's normal ADL habits are compromised. These systems rely on sensors placed throughout the elder's home that communicate to a computer that infers ADL activities. For example, if a motion sensor in the bedroom normally senses movement at approximately 7:00 AM every morning, then one day if there has been no motion sensed by 8:00 AM, the system may infer that something is wrong and call for help. Also known are prior art systems which employ an algorithmic approach to gathering data and inferring ADL levels from the data. These systems are severely limited because (i) they only work with a single person living in the home; (ii) they require complex and expensive computer and sensor infrastructures to be installed throughout the entire home; and (iii) most significantly, they typically take many tens-of-minutes to hours before they determine that a pattern is truly changed and hence an alarm for an emergent event should be generated—these are many hours that a fall victim is potentially lying in pain on the floor.

More direct monitoring approaches have also been tried. Indeed, a video monitoring system has also been suggested to detect falls. While this approach again has the advantage of allowing remote detection of falls, it has a very significant limitation in that it requires video cameras to be constantly monitoring all the rooms of the elder's home. This creates obvious and significant privacy concerns.

Another prior art system describes utilizing ceiling-mounted Doppler radar units which determine a person's distance from the floor; if the distance measurement indicates that the person is closer to the floor, an alarm is generated. While this system is valuable in that it is passive (doesn't require the elder to wear anything), the ceiling-mounted devices are difficult to install and expensive. As described, it also only detects falls and not other activities.

Yet another prior art passive fall detection system illuminates a potential fall victim with infrared light and uses infrared depth sensors to determine a point on the person's body, then calculates if that point gets closer to the ground. Infrared depth sensors are used in the Microsoft (Redmond, Wash.) Kinect game sensor. The challenge with these devices is that their resolution decreases significantly as a function of distance; they are optimized for a range of 8-10 feet; it is desirable to be able to monitor an entire room (which could be 20+ feet long) with a single device. Such prior art devices can typically only detect falls and not other events.

Another prior art device is a combination system that uses an on-body accelerometer similar to those described above, and a camera. If the accelerometer detects a fall, an image from the camera is analyzed to confirm the fall. While this approach must help reduce the false alarms created by having only one sensor, it unfortunately has the disadvantages of both accelerometer- and video-based solutions. Namely, it requires the person to remember to constantly wear the accelerometer and has the privacy concerns of video monitoring.

Still another prior art system is a passive fall detection system that uses two sensors to establish upper and lower zones in a room. The outputs of these sensors are monitored and compared to known "fall signatures"; the system essentially determines if infrared energy moves from the upper into the lower zone of the room and, if so, determines that a fall must have occurred. This "dual zone" approach is subject to a high false alarm rate because the system cannot distinguish a fall from laying down in bed or a fast movement to sit down. Since the system only looks at infrared energy it cannot distinguish pets from humans, which also generates false positive alarms. The system also will not work there is more than one person in the room. Finally, while this system can identify movement as well as falls, it cannot identify events such as visitors, bathroom use, etc.

Some prior art systems use a single sensor installed at a known distance from the floor. Based on this known distance, a reference line is established which essentially divides the room into two zones. Motion information from above and below the reference line is analyzed to determine if the motion moved from above the line to below the line; if this is the case it is determined to indicate a fall. Since some systems describe analyzing an image (as opposed to simply the infrared energy), it is hypothetically less prone to false alarms from pets. However, this approach still suffers from high false positives because the system cannot distinguish a fall from laying down in bed or a fast movement to sit down. It is also subject to the obvious disadvantage of needing to be accurately and precisely placed a known distance from the floor, which complicates installation.

Accordingly, a need exists for a less complex, less intrusive and privacy maintaining system which allows the monitoring of various selected parameters inside an occupied space with a goal toward being able to make a determination as to whether or not the occupant of that space is in need of assistance or is exhibiting signs of a change in pattern that might indicate a medical condition or the beginning of some medical condition.

SUMMARY

Based on the aging population and the desire for older people to live in their own homes, there is a need for a system to passively monitor emergent, safety and habitual events in the home. The system should be able to detect all emergent or safety events, be inexpensive, unobtrusive, easy to install, fast to alarm, have a low false alarm rate and not raise privacy concerns among the occupants of the house. Such a system will be described below.

The system of the present invention is simple enough to be installed and used by the elder, does not require special networking infrastructure (including an Internet connection), and does not require the elder to wear a special device, push any buttons if they fall or change their lifestyle in any way. The system can detect a variety of events, including but not limited to activity, falls, getting in and out of bed, visitors, leaving the house, sitting, standing, and the use of the toilet. The system is also highly immune to false alarms caused by pets, crawling children, laying down in bed or the elder purposely getting down on the floor. Finally, the system is inexpensive enough to be available to virtually anyone of any economic means.

In one embodiment, the system of the present invention may include an imager that can capture an image of any arbitrary space. This imager can sense visible images or infrared images. The resolution of the images can be relatively crude—32×32 pixels will be assumed in the subsequent examples. This reduces the processing power and also reduces privacy concerns because no discernable features can be obtained. The system can capture images sequentially and subsequent images can be processed in such a way to remove stationary elements of the image. For example, if an image is captured at time T(1) it can be represented by a 32×32 matrix. A subsequent frame can be captured at time T(2), again represented by a 32×32 matrix. These two matrices can arbitrarily be labeled the F(1) and F(2) for the first and second frame respectively. F(2) and be subtracted from F(1)—if there is no activity in the field of the images the resultant matrix, R(2), will be zero. If there is activity in the room, the resultant will have only the active portion of the field. In this way, all the stationary elements of the room (furniture, etc.) will be removed and only the object that is moving will remain.

In a similar means, the range-finder can capture data regarding the distances of the various objects in the space at time T(1) and T(2). This data can also be subtracted; as with the image data, if there is no activity in the room the resultant will be zero. If there is moving, the resultant, D(2), will be the distance of the moving objects. For example, if the range-finder is ultrasonic, the output for a single "ping" at a given time is time-versus-amplitude data. If there is no activity in the room, a subsequent "ping" will return a similar time-versus-amplitude data so when these two data points are subtracted the result will be zero. However, if there is movement in the room the resultant will be the distance of the moving object for the sensor. In this way, an accurate distance measurement can be made of only the moving objects in the room, independent of any other objects.

Objects closer to the imager appear bigger than objects further away. For example, a person who is 6 feet tall may occupy the entire frame of a captured image if they are standing right in front of the camera and only a quarter of the frame if they are standing 20 feet in front of the camera. To compensate for this, a predetermined calibration factor is determined for the imaging system; this also compensates for the lens and camera optics. For a given distance, the calibration factor corrects the captured image and allows the actual height of the moving object in the image to be calculated. In the previous example, because we know how far the person is from the imager, and can thus apply the correct calibration factor, we can calculate their height correctly as 6 feet height regardless of how high they appear to be in the captured frame. This calibration factor may be a mathematical equation or a set of factors (one for each distance). For example, if one is using a set of factors to correct the images and if the objective of the system is cover a room 20 feet long, one calibration matrix would be required for all potential distances. Practically speaking, one may assume that 20 different matrices, one for every foot from the imaginer, can be used.

Based on the distance D(2), the appropriate calibration factor is applied to image R(2); this gives us a matrix, M(2) that contains the height of all the moving objects in the frame. This process repeats as long as there is activity in the room, resulting in a series of matrices M(n), M(n+1), M(n+2), etc. that correspond to the heights of the moving objects in the room. These matrices are then analyzed for various predetermined events.

For example, if there is a resultant matrix at all we know there is activity—this event can be transmitted to the central processor for further analysis. If the matrix M(n) shows multiple moving objects, one can surmise there are multiple people in the room and hence visitors.

Subsequent matrices can be analyzed as a percentage of previous matrices to determine if a fall has occurred. For example, if matrix M(n) has a moving object of arbitrary height h in it, and matrix M(n+1) shows an object that is 20% of h, one may surmise that a fall has occurred. If the object in M(n+1) is at a higher percentage, for example 50%, one may assume the person has sat down in a chair. Conversely, if the M(n+1) is 200% of M(n), one may assume the person has stood up. If the sensor is known to be in a bedroom, similar logic can be used to determine if someone is getting into or out of bed.

In the first embodiment, the present features a system for detecting events in a predetermined space comprising an imager, configured for capturing one or more images of a predetermined space and for providing one or more image signals representing the captured one or more images of the predetermined space. The invention also features a range-finder, disposed proximate the imager, and configured for determining a distance of one or more objects located in the predetermined space from the imager, and for providing at least one distance signal.

A processor is coupled to the imager and the range-finder, and responsive to the captured one or more images of the predetermined space received from the imager and the at least one distance signal, and programmed to calibrate the captured one or more images of the predetermined space based on a predetermined calibration factor; analyze the calibrated captured one or more images of the predetermined space to determine if certain predetermined events have occurred in the predetermined space; and generate an output indicative of the determination that one or more of the certain predetermined events have occurred.

The system also includes a transmitting device, coupled to the processor and responsive to the processor generated output indicative of the determination that one or more of the certain predetermined events have occurred, for transmitting the output of the processor.

In another embodiment, the system according to the present invention includes a microphone and a speaker that can provide communications to and from the occupant(s) of the space. This communications may be two-way and allow a caregiver or other interested party to talk to the occupants of the room utilizing the speaker and to also receive communications from the occupants of the room utilizing the microphone. The communications may also be one-way which would allow the remote monitoring of the space by use of only the microphone.

The microphone is used to receive both human generated and non-human generated sounds which are processed by a processor. The processor may determine if the sounds correspond to certain events, such as the ringing of a phone, the ringing of a doorbell, the alert from an alarm, timer or appliance, voices, water running from a bathroom, computer sounds such as computer keyboards strokes or computer "dings" or other sounds that can be used to infer events in the space. These events can then be used to establish other contexts such as whether or not an occupant is participating in a normal activity he or she is expected to participate in with a view, again, to determine whether or not there is a risk of the existence of a medical condition or of the beginning of a medical condition.

More specifically, the microphone has two primary functions. The first is to act as a means of verbal communications to allow human voices to be transmitted and received. The second is a means to receive non-human (i.e. machine made) sounds (such as those from a smoke or other alarm, timer, water running, doorbell ringing, computer sounds etc.) and send these machine-made sounds to the processor. The processor then analyzes these machine sounds to infer events in the space. While any given machine sound may occur for a relatively short period of time (for example, a timer sound in the kitchen may itself last only a few seconds, or water from a shower in the bathroom may last for tens of minutes), the processor analyzes these sounds over a much longer time of days, weeks or sometimes perhaps even months in the hopes of determining patterns of such sounds. To continue the example above, while it is useful to know that the microwave oven timer went off on a given day, it is much more interesting to know that over a period of weeks or months the microwave oven is being consistently used every morning; this implies that the occupant is regularly eating breakfast in the lack of such sound may, after a day or two, indicate the existence or beginning of some medical condition. By similar analogy, knowing that an elder is showing regularly is important data for remote caregivers.

Note that while the two actions of the microphone (human voice reception and machine sound reception) are used for fundamentally different functions (communications and event determination), both of these functions can be combined with other features of the system to create higher reliability. For example, if the imager described above determines there is a likely fall, the machine sound function of the microphone can be used to listen for the absence of other sounds (i.e. if someone is on the floor it is unlikely they will be using the microwave or going to the bathroom or taking a shower). Or if a fall is detected and simultaneously the human voice reception detects "HELP!" or a scream, there is higher confidence that something is wrong. The receipt and detection of key words such as "help" or a scream or other "trigger word" detection can also be used independently to summon help.

In one embodiment, the imager is a camera and the imager captures an image by capturing one of infrared or thermal energy. The imager may be a thermopile or a pyroelectric infrared (PIR) element. The rangefinder may be a radio-frequency (RF) range-finder or an optical range-finder.

The system image calibration factor may be selected from one or more calibration factors including a mathematical equation, a look up table and a matrix and the events to be detected are selected from events consisting of activity, fall, sitting down, standing up, multiple people in the predetermined space and a button push.

The processor generated output may be one or more of a group of outputs including a wireless connection, a Wi-Fi output, a cellular output, a Bluetooth output, a wired connection output, an Ethernet output, a low-voltage alarm connection, a call to a nurse, a call to a family member, a light and an audible alarm.

The system processor may be programmed to analyze the calibrated captured one or more images to determine if the predetermined event is a person getting into or out of bed.

The invention also features a method for detecting events comprising the acts of capturing at least one image of a predetermined space using an imaging device determining the distance of one or more objects located in the predetermined space from the imaging device. A processor is programmed to receive the captured at least one image and the determined distance; calibrate the captured and received at least one image based on a predetermined calibration factor; analyze the calibrated image and responsive to the analyzing, determining if certain predetermined events have occurred in the predetermined space; generate an output responsive to the determining that certain predetermined events have occurred; and transmitting the output of the processor to a receiving device.

The invention also features a system for detecting events in a predetermined space comprising an imager, configured for capturing one or more images of a predetermined space and for providing one or more image signals representing the captured one or more images of the predetermined space and a range-finder, disposed proximate the imager, and configured for determining a distance of one or more objects located in the predetermined space from the imager, and for providing at least one distance signal. A sound capturing device is also provided in this embodiment and is configured for capturing at least one of a plurality of predetermined sounds in the predetermined space, and responsive to the capturing, for providing a captured sound signal indicative of the detection of at least one of the plurality of predetermined sounds in the predetermined space.

A processor is coupled to the imager, the range-finder and the sound capturing device, and responsive to the captured one or more images of the predetermined space received from the imager, the at least one distance signal and the captured sound signal, is programmed to: calibrate the captured one or more images of the predetermined space based on a predetermined calibration factor; analyze the calibrated captured one or more images of the predetermined space to determine if certain predetermined events have occurred in the predetermined space; analyze the captured sound signal; and responsive to the act of analyzing the calibrated captured one or more images of the predetermined space and analyzing the captured sound signal, determining that one or more of the certain predetermined events have occurred and generating an output indicative of the determination that one or more of the certain predetermined events have occurred.

A transmitting device is coupled to the processor and is responsive to the processor generated output indicative of the determination that one or more of the certain predetermined events have occurred, for transmitting the output of the processor.

In another embodiment, the invention features a system for detecting events in a predetermined space utilizing a sound capturing device, the system comprising a sound capturing device, configured for capturing at least one of a plurality of predetermined sounds in the predetermined space, and responsive to the capturing, for providing a captured sound signal indicative of the detection of at least one of the plurality of predetermined sounds in the predetermined space.

A processor is coupled to the sound capturing device, and responsive to the captured sound signal, is programmed to: analyze the captured sound signal; and responsive to the act of analyzing the captured sound signal, determines that one or more of the certain predetermined events have occurred and subsequently generates an output indicative of the determination that one or more of the certain predetermined events have occurred. A receiving device is coupled to the processor and responsive to the processor generated output indicative of the determination that one or more of the certain predetermined events have occurred, for receiving the output of the processor indicative that one or more of the certain predetermined events have occurred.

In yet another embodiment, the invention features a method for detecting events utilizing a sound capturing device wherein the method comprises the acts of capturing at least one of a plurality of predetermined sounds in the predetermined space, and responsive to the capturing, for providing a captured sound signal indicative of the detection of at least one of the plurality of predetermined sounds in the predetermined space. The method provides a processor, coupled to the sound capturing device, and responsive to the captured sound signal, is programmed to: analyze the captured sound signal and responsive to the act of analyzing the captured sound signal, determining that one or more of the certain predetermined events have occurred; and generating an output indicative of the determination that one or more of the certain predetermined events have occurred; and transmitting the output of the processor to a receiving device.

BRIEF DESCRIPTION OF DRAWINGS

These and other characteristics of the event system will be more fully understood by reference to the following detailed description in conjunction with the attached drawings, in which:

FIGS. 3A-3D represent a set of matrices representing the images captured by the imager described in the present invention wherein FIG. 3A is a first image in which only a piece of furniture is in the room; FIG. 3B is a subsequent image of the same predetermined space and in which a person has entered the space; FIG. 3C is the resultant image of the subtraction of the images in FIGS. 3A and 3B; and FIG. 3D is an image wherein the person that entered the room in FIG. 3B has moved further away from the imager but such distance cannot be determined using solely the imager but must utilize the range-finder according to one aspect of the present invention;

FIGS. 4A-4D are a set of output graphs representing the data returned by an ultrasonic range finder, wherein FIG. 4A is a first output; FIG. 4B is a subsequent output; FIG. 4C is the resultant output of the subtraction of the outputs of FIGS. 4A from 4B; and FIG. 4D is illustrates the output from the range-finder of the present invention as applied to the person in FIG. 3D that has moved further away from the imager;

FIG. 5A represents a room calibration matrix utilized to create a height calibration factor matrix for each position in a room; and FIG. 5B is a side view representation of a height pole used to generate the height calibration factors for a room;

FIG. 6B is a matrix of the image of FIG. 6A to which the room calibration factors computed as described in connection with FIG. 5 showing the computed actual height of the object in the room;

FIG. 8 is a flow chart describing the detailed processing steps of the present invention which are performed to determine events.

DETAILED DESCRIPTION OF THE PREFERRED EMBODIMENTS

The present invention features and discloses a system and method that determines if certain events have occurred in an arbitrary space. The foundation of the system of the present invention is a pyro-electric sensor that detects activities (an enhanced burglar alarm detector) capable of detecting motion, sound and/or distance; either all together, independently or in various combinations. By putting one of these sensors in each important room, the present invention can figure out where the elderly person (or other person of interest) is and how active they are in each room as a function of time. The recorded information is then stored and trended allowing the system to look for changes and issue alerts on events that might be problematic. For example, an increase in nighttime bathroom use across 2 nights typically means an elderly woman has a urinary tract infection).

Figure 1:
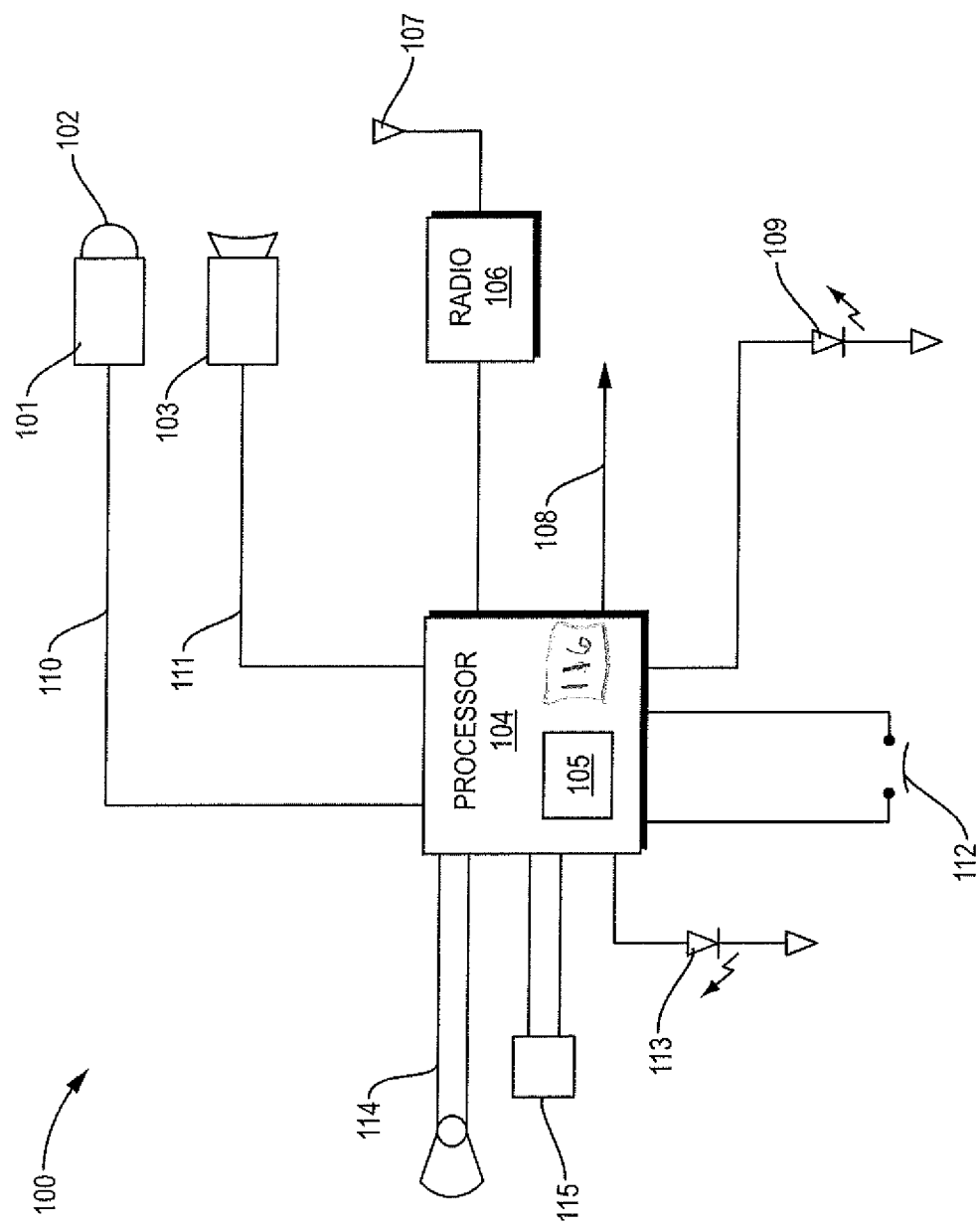
FIG. 1 is a schematic block diagram of the system according to the present invention.

FIG. 1 depicts an exemplary embodiment of such an event detection system 100 according to the teachings of the present invention. A system according to the present invention may include all or some of the elements disclosed and described in connection with the event detection system 100. In one embodiment, the illustrated system 100 includes an imager 101 which may be sensitive to visible, infrared or other energy. Imager 101 may be a standard imager such as a QVGA or VGA camera or it may be a low-resolution imager such as those used in optical mice. Regardless of the native resolution of the imager 101, the image may be processed to reduce its resolution such that images are obscured so as to not provide/disclose any personal information or identification data. For example, the image may be 32=32 pixels. Imager 101 may also have a lens 102 to enhance its field-of-view. For example, lens 102 may have a 180 degree view, a so-called "fish-eye lens", to enable the imager 101 to capture images of an entire room. System 100 may also have an illuminator 109 which may create visible or infrared light to illuminate the field of view as necessary for the imager 101.

System 100 may also, in one embodiment, include a range-finding device 103. The range-finding device 103 may be based on sound-waves, such as ultrasound, radio frequency, such as ultra-wideband, or light, such as a laser. Imager 101 with its accompanying lens 102 and range-finder 103 may be functionally co-located to be in the same enclosure or is separate devices, located in close proximate to one another. Imager 101 and range-finder 103 are connected to processor 104 using appropriate interconnections 110 and 111 such as a serial bus or other practical means. It will be apparent to one having ordinary skill that there are a variety of means to interconnect the components of the system 100 without significantly changing the form or function of the system.

Processor 104 contains memory 105 and executes an appropriate processor control software program 116. Processor 104 executes appropriate processor software 116 to accomplish the processing such as described, for example, in FIGS. 7 and 8 to process the data obtained by imager 101, range-finder 103 and/or microphone 115, and as described and claimed in other portions of the present application in order to determine if certain events have occurred. Data about these events, and/or other data as appropriate, may be sent by the processor 104 to other devices or systems through wireless link 106 or a wired link 108. The wireless link 106 may be WiFi, cellular, UHF, optical or other appropriate technology and may have a signal radiator 106 and/or antenna 107. The wired link 108 may be Ethernet, serial, low-voltage, contact closure, or other appropriate technology. Processor 104 may also have one or more visible and/or audible indicators such as LED 113 to indicate various events. Processor 104 may also connect to various input devices 112 such as buttons or keyboard.

One or more speakers 114 are connected to processor 104 and may be used to create alert tones and/or to allow the transmission of voice or other audible signals from remote locations (through links 108 or 106). One or more microphones 115 are connected to processor 104 which can be used to monitor voices (human sounds) and/or mechanical (non-human) sounds in the room and/or allow these signals to be processed and/or transmitted over links 108 and 106.

A microphone 115 is provided integral with, in connection with or alternately in place of the image sensor 101 in any given room or space. The microphone 115 may listen for all sounds or may listens only for very specific sounds. There are currently 8 specific non-human sounds that are preferably listened for. These include (but are not limited to) toilet flushes, water running, smoke alarm signals, door bells, microwave oven beeps, telephone rings, TV sounds, computer related sounds (keystrokes and computer "dings" or other audible sounds) and conversation in general.

For example, in the bathroom, the system might listen for water running and toilet flushes or the absence of such sounds. In the example above, this sound sensing allows the system to determine that a person is using the sink or tub, taking a shower, or using the toilet. Using this sound information either alone or in connection with the image and range-finder information allows the system to more accurately detect events of interest and to distinguish events of interest from "normal" events that are not of concern. Such sounds on an individual day basis may not be helpful in identifying a problem or concern but over a period of time such as days or even weeks, a "pattern" can develop against which daily or specific individual occurrences can be measured or compared.

For example, if a bathroom microphone 115 detects a pattern of an occupant getting up one time during the night at or around midnight to go to the bathroom and flushes the toilet but then suddenly, this occupant is utilizing the bathroom and flushing the toilet multiple times per night, this might indicate that the occupant has a urinary tract infection because the current sound(s) is/are not consistent with the stored "history" or pattern of this sound in this particular room. The system may then alert a caregiver to the potential problem before it gets to serious.

The microphone 115 can be in an always-on state; in which the sound waves received by the microphone are converted to electrical signals and processed by processor 104. This processing can include matching the received electrical signals with certain predetermined patterns. For example, one such pattern could be that of a ringing telephone. The various methods method of matching the incoming signal with the predetermined signal are well known to those versed in the art. Again, the determination of a ringing telephone can be compared with historical data to determine whether or not there is or might be a problem. For example, perhaps someone because the occupant each day between 9 and 10:00 AM and the occupant speaks for fifteen minutes. This could be stored as a historical and desired pattern. If the telephone then starts ringing between 9 and 10:00 AM but no ensuing occupant voices detected, the system may determine either immediately or after perhaps one day of missing such occurrence that there is something amiss with the occupant and may alert caregivers to check on the occupant.

Those of ordinary skill in the art will understand and realize that many other such non-human (machine generated) sounds may be listened for and a pattern determined to assist in the determination as to whether or not the occupant of the space is well.

Figure 2A:
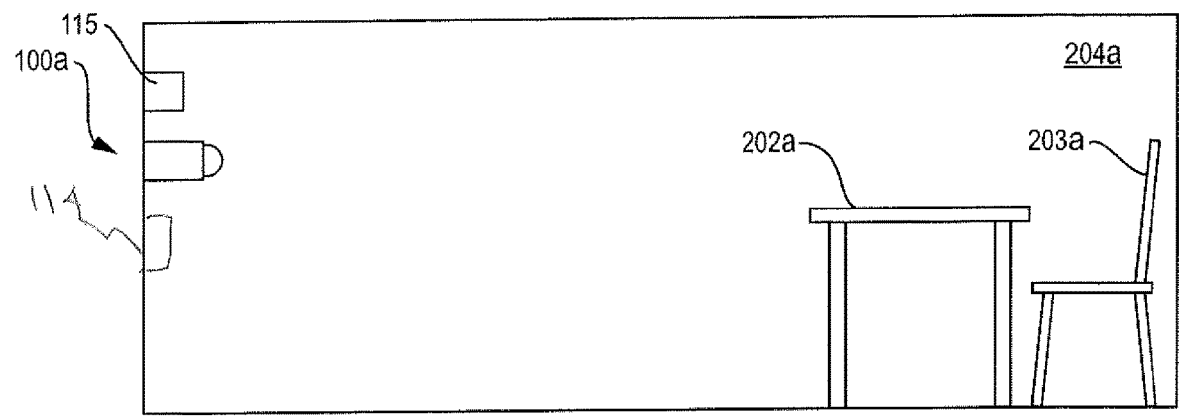
FIGS. 2A-2C represent side views of a room with the system of the present invention mounted to a wall within a room.
Figure 2B:
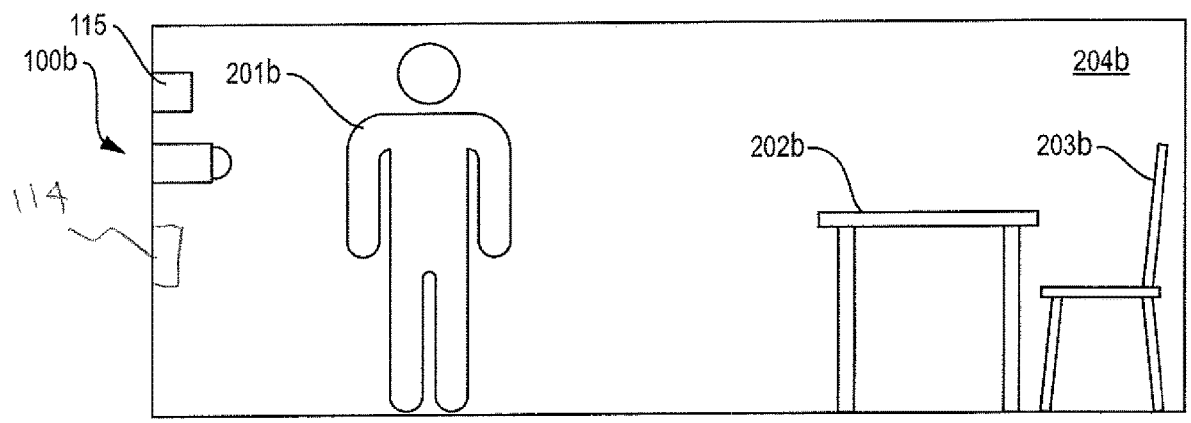
Figure 2C:
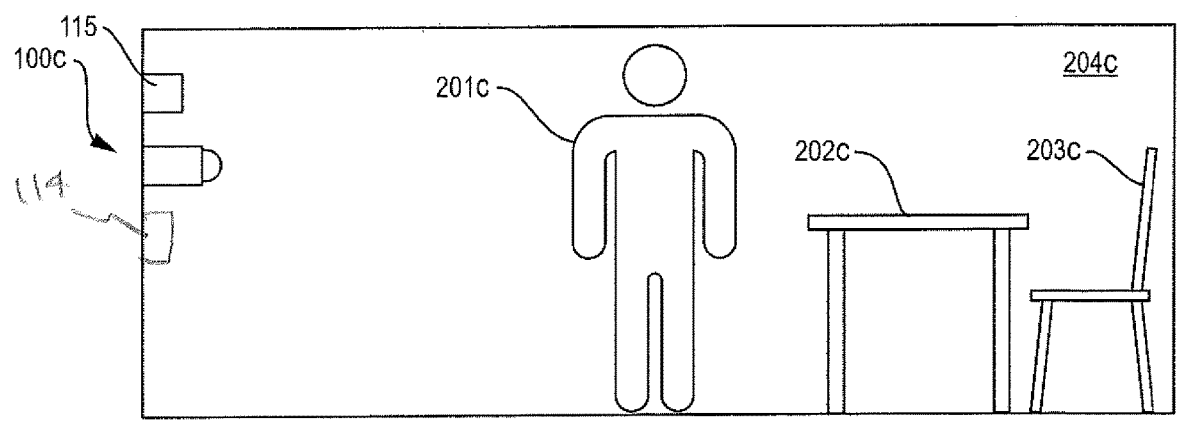

FIG. 2 depicts a side view of a room 204 with the system 100 mounted to the left wall of the room. There are three different configurations of the room. In room 204*a*, FIG. 2A, the system 100*a* is mounted on the left wall and there is a chair 203*a* and a table 202*a*. In room 204*b* FIG. 2B, there is the same system 100*b* mounted on the wall, the chair 203*b* in the same location as depicted in 204*a* and the table 202*b*, also in the same location. However, in room 204*b* a person 201*b* has entered the field. In room 204*c* FIG. 2C, the same system, 100*c*, and the same stationary furniture chair 203*c*, and table 202*c* are illustrated. In room 204*c*, the person 201*c* has moved toward table 202*c* and away from system 100*c*. For the sake of this description we will assume the person 201 walked straight away from sensor 100*c* and did not move in any other direction.

Figures 3A, 3B:
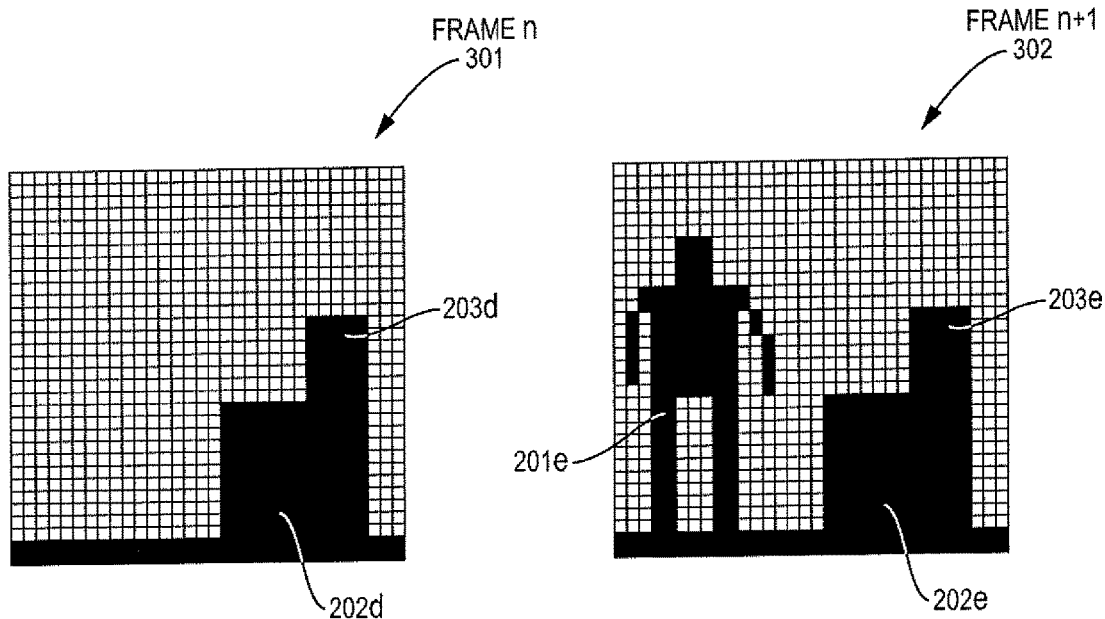

FIGS. 3A-3D depict the 32×32 pixel images captured from the imager 100 in FIG. 2. Image 301 FIG. 3A represents the view of the room depicted in room 204A in FIG. 2A as seen by imager 100*a* wherein the tall chair 203*a* from FIG. 2A is shown in this image as 203*d*. Note that this image capture is representative of step 701 in FIG. 7. The tall chair 203*a* overlaps the table 202*a* from FIG. 2A which is shown as 202*d* in image 301, FIG. 3A. Note that the chair and table overlap, so the bottom part of both the chair and the table appear to be one object in image 301 FIG. 3A.

In FIG. 3B image 302 is a new image taken by system 100 (this corresponds to step 702 in FIG. 7) and also corresponds to the room depicted as 204*b* in FIG. 2B. In this representation, the imager 100 has again captured chair 203 and table 202 and these are shown as 203*e* and 202*e* respectively. However a person 201*e* has entered the frame (which is analogous to 201*b* in FIG. 2B).

Figures 3C, 3D:
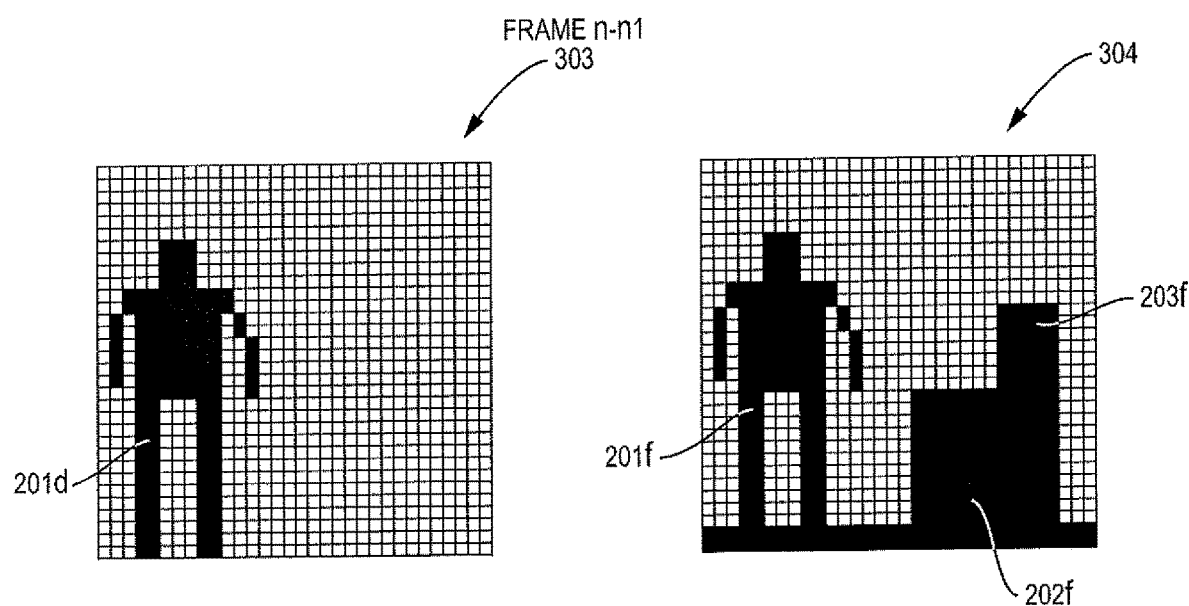
Figure 7:
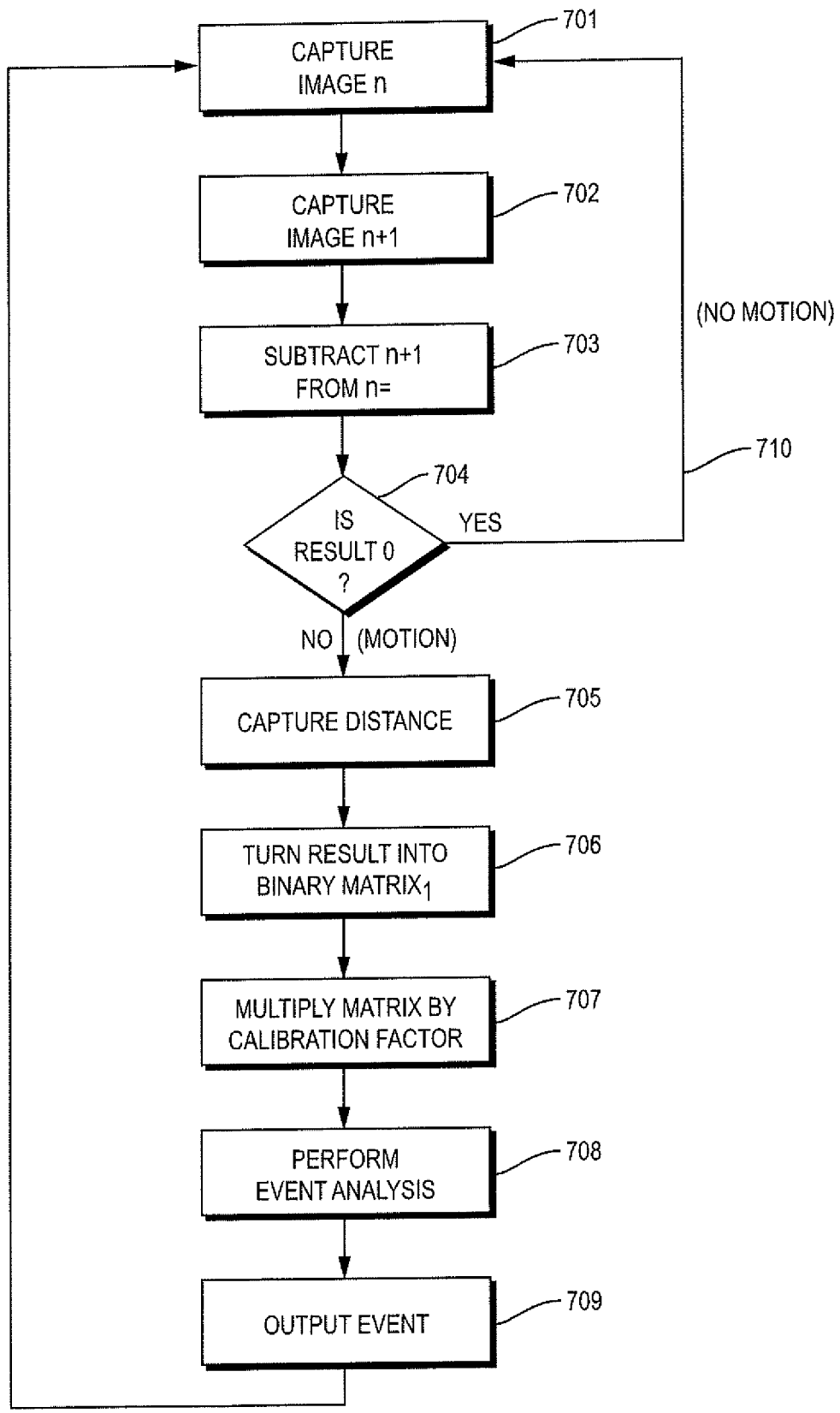
FIG. 7 is a flow chart describing the high-level processing steps of the system operating in accordance with the present invention.

When processing step 703 from FIG. 7 is applied to images 301 and 302 in FIGS. 3A and 3B, the resulting image is 303, FIG. 3C. Note that the chair and table have both disappeared as they did not move and hence were "subtracted" out. The person 201*d* remains in the image however. If there was no change in the captured images the result of subtracting the two images 301 and 302 will be zero which means that there is no motion in the room and the system simply goes on to capture more images as depicted in step 710 in FIG. 7.

Image 304 in FIG. 3D shows the image 201*f* of a person depicted as 201C in FIG. 2C. When image 304 from FIG. 3D is compared to image 302 in FIG. 3B, the person 201*f* is analogous to person 201*b* in FIG. 2B and has moved directly away from the imager but is in the same location in all the other dimensions as shown in FIG. 2C. In reality, the image 201*f* in FIG. 3D should be slightly shorter than image 201*d* or 201*e* as the person 201 has moved farther away from the imager of the system 100*c*, but the relatively low resolution of the imager 101 makes this difficult to discern and is the essential reason range-finder 103 is required in the system. Note that chair 203*f* and table 202*f* look the same as depicted in frames 301 and 302.

Figure 4A:
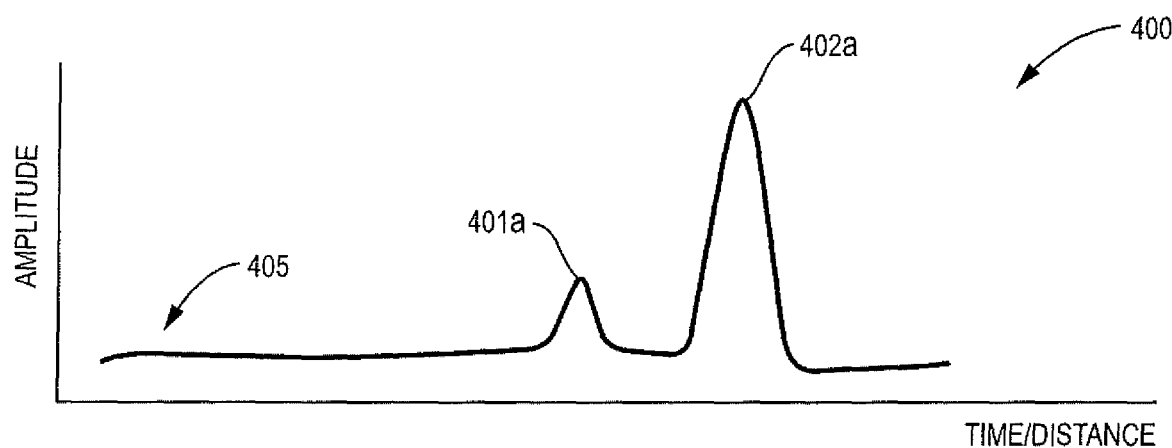

One way to determine range is to use an ultrasonic range-finder as described in connection with range-finder 103 in FIG. 1. These are widely used for automotive parking systems so are readily available and relatively inexpensive. FIGS. 4A-4D show the data set that results when the ultrasonic range-finder 103 is part of system 100. When the range-finder 103 sends out a "ping" or other device appropriate signal to assess the distance of objects from the sensor, the result is a set of data points that show the amplitude of the returned signal as a function of time, depicted as image 400 FIG. 4A. Since the speed of sound is known, a simple calculation of distance=rate*time that provides the bottom axis of FIG. 4A is also a measure of distance from the sensor 103 and imager 100.

Graph 405 FIG. 4A shows the data from a "ping" associated with image 204a FIG. 2A. Spike 401a corresponds to the table (202 in FIGS. 2A-2C) and spike 402a corresponds to the chair (203 in FIGS. 2A-2C). The chair 203 is larger in cross section, which causes more of the ultrasonic energy to be returned and hence spike 402 is larger than spike 401.

Figure 4B:
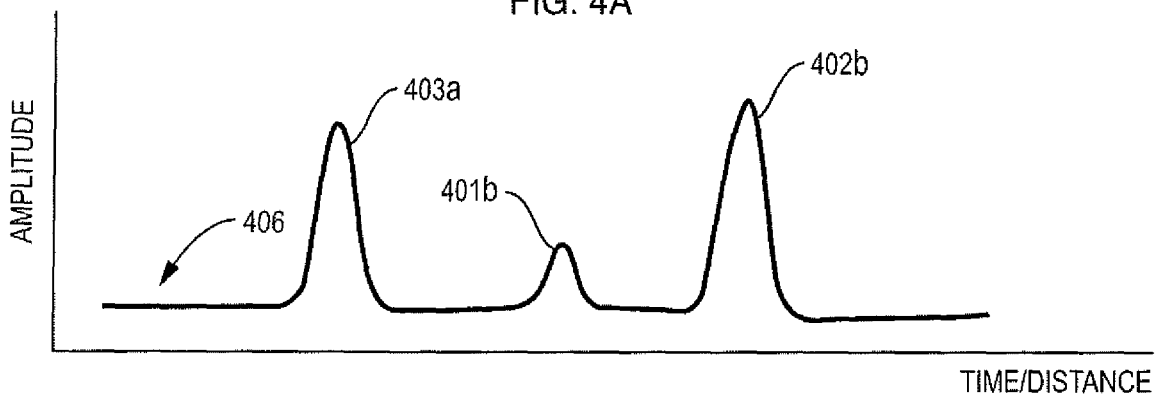
Figure 4C:
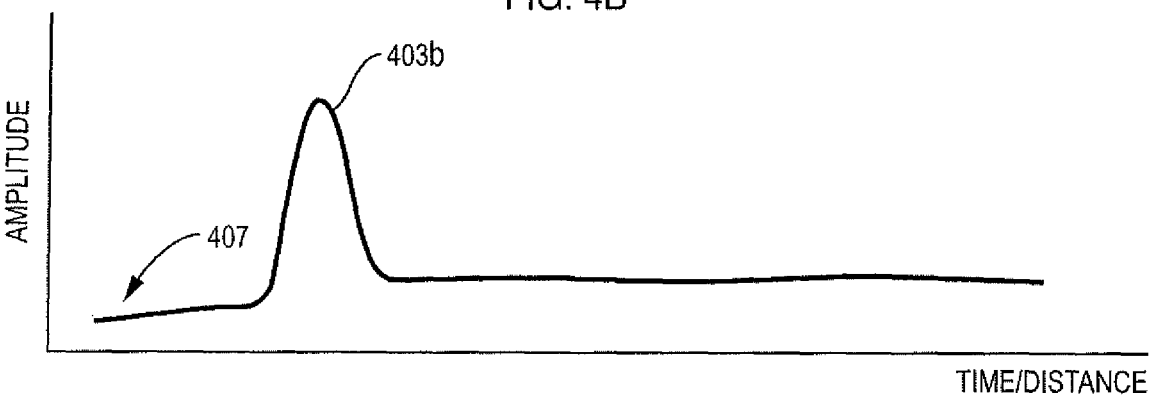

Graph 406 FIG. 4B shows a subsequent ping after a person 201 has moved into the field; this is analogous to the scenario depicted in image 204b in FIG. 2B. In this case, there is a new spike 403a in the graph 406. This signal is due to the new object in the room, the person 201. Just as image frame (n+1) was subtracted from frame (n) to leave only the moving object in the result in FIGS. 3A-3D, if data from graph 406 in FIG. 4B is subtracted from the data in graph 405 FIG. 4A, a single spike 403b, FIG. 4C, is left depicted as shown in graph 407. This is described as step 705 in FIG. 7. The spike 403b represents the distance between the moving object and the sensor.

Figure 4D:
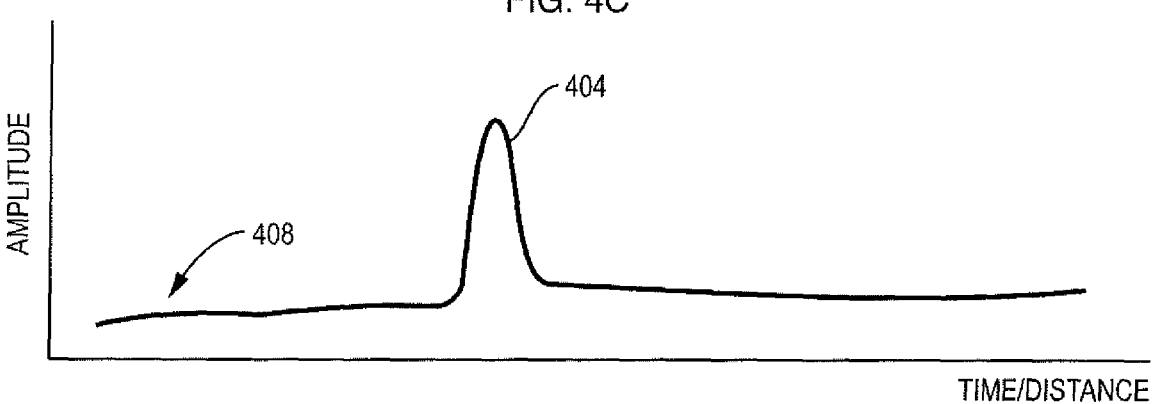

By similar fashion, graph 408 FIG. 4D shows spike 404 which is the distance the person 201c is from the sensor in scenario 204c in FIG. 2C. Note that the amplitude of 404 is roughly the same as 403b as the person has the same basic cross-section, but the distance is farther, as depicted in FIG. 2.

At this point in the processing the system 100 has an image that contains only the moving object(s) in the room as well as accurate distance measurements of these objects(s). Next, based on the distance measurement, the calibration factors are applied to the image to determine the actual heights of the object(s) in the image.

FIGS. 5A and 5B show one method for creating the calibration factors. FIG. 5a depicts a room 501 of approximately 20 feet deep and 32 feet wide. It is understood that the actual size of the room is arbitrary and the 20×32 foot room in FIG. 5 is only one example. The distances in feet from the lower wall to the back wall are labeled 502 and the distances from the left to right walls are labeled 503. The event detection system 100A from FIG. 1 is mounted on the front wall, half way between the left and right walls, i.e. at location (0,16), and is labeled 504.

FIG. 5B is a marker 505 that is eight feet tall with each foot of vertical height marked in a contrasting color, 506. The marker is on wheels 507 which allows it to be easily moved. Marker 505 is moved to the grid location in FIG. 5A and an image is captured by system 100A of the marker in that location. This will result in 20×32 or 640 different images. Each of these images is analyzed to create a location specific calibration factor that correlates the number of pixels captured by the imager with each of the heights marked on marker 505 for each location. In other words, when the marker is in the center of the room at location (10,16), the imager 101 may show that the 8 foot indicator on the marker corresponds to 32 pixels and the 4 foot indicator corresponds to 16 pixels. Therefore, at this given location, each pixel represents (8×12)/32=3 inches. In this example, each of the 640 calibration locations will have a unique calibration factor. One may create a matrix with 32 columns and 20 rows that contains these calibration factors; the rows of this matrix correspond to the distance an object is from the sensor and the columns correspond to where the object is with respect to the left or right of the sensor. It is understood that there are many methods of creating the calibration factors, including developing mathematical equations, convolutions, or other means. As long as the optical characteristics of imager 101 and lens 102 don't change, the calibration factors determined should apply to all situations where the system is deployed. This means that, assuming distance from the imager to the moving object is known, the appropriate row of the calibration factor matrix can be applied to the images captured to obtain an actual height of the objects.

Figure 6A:
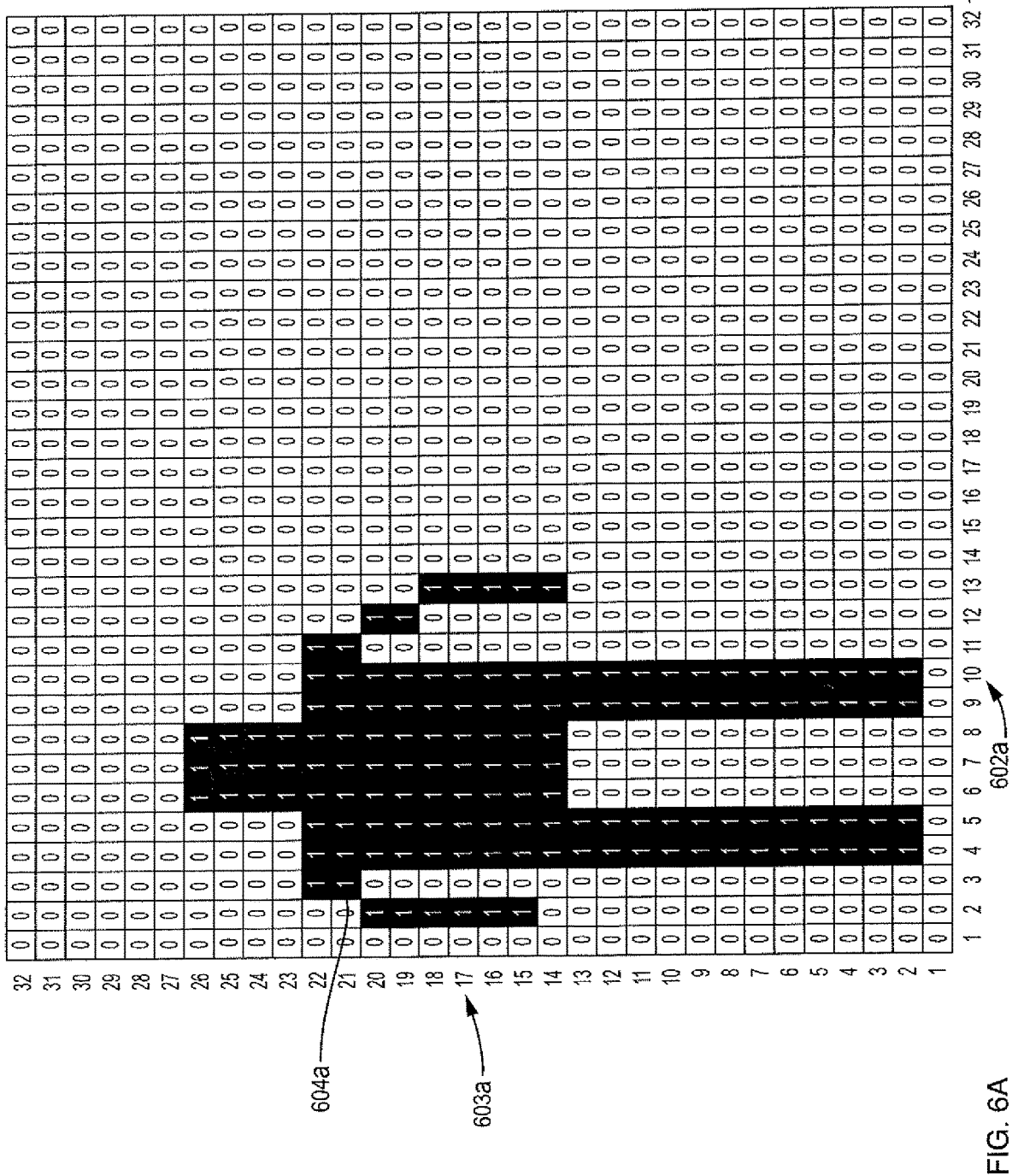
FIG. 6A is a resultant matrix of an image taken in a room.

The image of the moving object depicted in FIG. 3B as 201d can be simplified—if there is any data in a given cell it will be assigned a value of "1" and if there is no data it will be assigned a value of "0" as described in step 706 in FIG. 7. The resulting 32×32 image matrix is depicted at 601a in FIG. 6A. For ease in illustration, the row and column numbers are noted as 602a and 603a respectively. Note that in FIG. 6A, the actual image 604a is shaded simply to help the reader understand the method.

Based on the distance between the moving object and the system 100 that has been determined by range-finder 103, the appropriate row of the calibration matrix can be selected. The calibration factors in each of the 32 columns can then be multiplied by the image matrix 601a in FIG. 6A as depicted in step 707 in FIG. 7. The result is a 32×32 matrix with the true height in inches of the moving object captured. This is depicted as 602 in FIG. 6B. In the example given, the maximum height of the image is 72 inches, as shown in cells (6,26), (7,26) and (8,26) in FIG. 6B.

For a single image we now have a 32×32 matrix with the actual heights of objects that are moving in the field of the imager; as depicted in FIGS. 2 and 3 this single image and its corresponding matrix 602 can be labeled (n). In reality there is a time sequence of these matrices; each matrix corresponds to one frame that is captured at a certain frame rate, which can be labeled n, n+1, n+2, n+3 . . . etc. so we also have a series of matrices. The matrices can then be compared one to the other which allows the system 100 to determine what is of interest namely, if a person has fallen, stopped moving and the like and to identify this as an "event".

FIG. 7 shows the overall summary of the processing that occurs to create this series of matrices that can be analyzed for changes that correspond to events. Step 708 is further explained in FIG. 8. If the processing in FIG. 8 reveals that an event being watched for has occurred, the event is outputted by the appropriate means such as by means of electronic signal, audible or visual means described above.

Figure 6B:
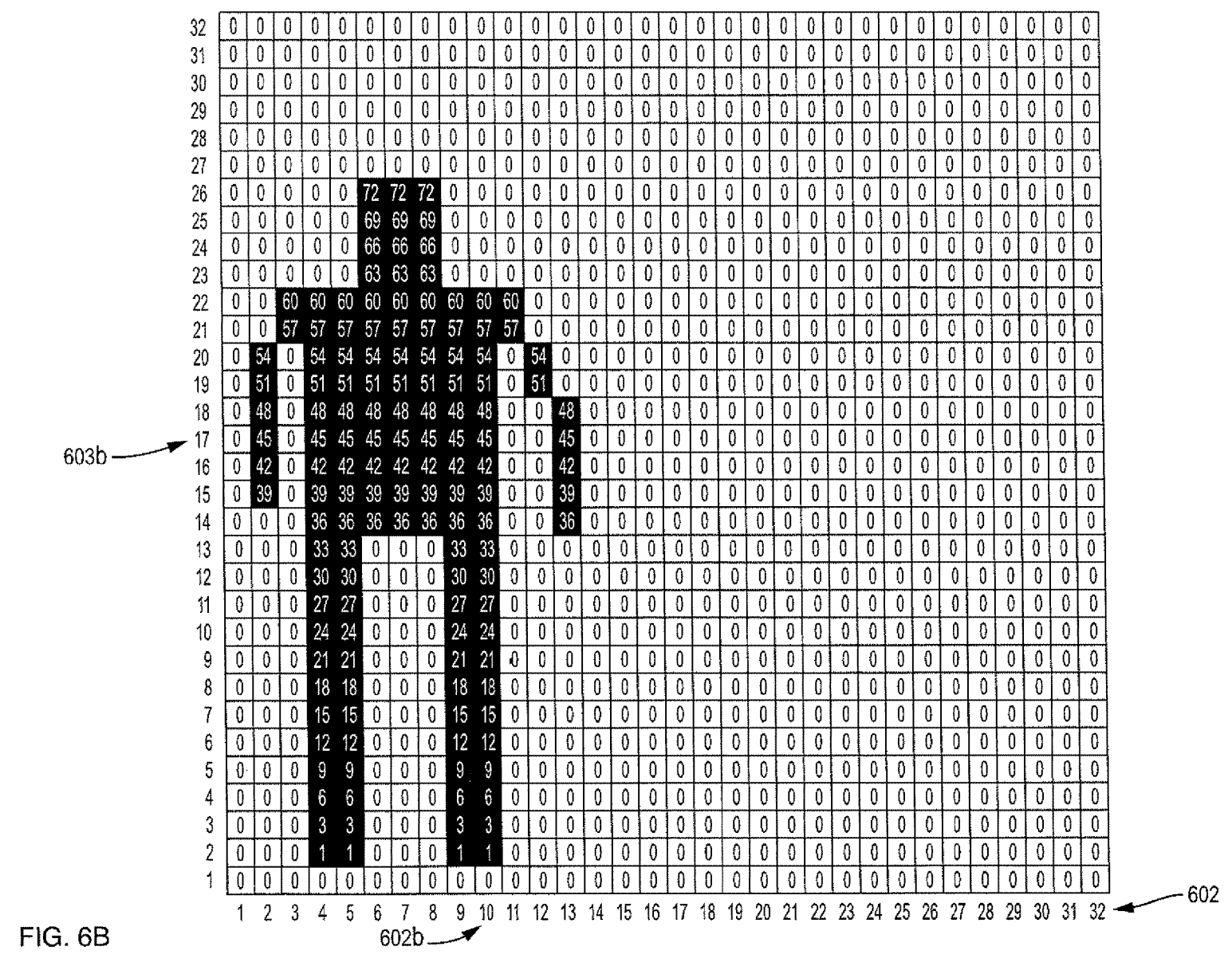

FIG. 8 is one means of analyzing the series of matrices 602 from FIG. 6B. If matrix 602(n) is non-zero, by definition there is motion in the room and this is the first event that is defined, as depicted in step 8.1. Next, it is first determined how many moving objects are in the room. This is done by scanning the columns of matrix 602(n) for maximum values (step 8.2.1) that are greater than 36", indicated by 8.2.2. As shown in step 8.2.3, if there are contiguous columns that have similar values these columns are deemed to be part of a single figure. If the maximum value in a column drops below 36", then raises again, this is deemed to be a second figure, 8.2.4; this is how multiple figures or people in a single frame are detected. This continues until the number of figures, designated m, is determined in each frame n. The maximum values for each of these figures is defined as max(m). If m>1, then there is more than one figure in the room and an event of visitors is deemed true.

Each individual figure m, m+1, m+2, etc. in subsequent matrices n+1, n+2, n+3, etc. is analyzed (step 8.3) to see if the maximum height of an individual has decreased dramatically over a short period of time. In 8.3.1.1 it is checked to see if the maximum height of the figure has dropped below 24 inches. If it hasn't 8.3.1.1.1) it is determined that there is no fall and the process continues. If the figure has dropped below 24", subsequent frames are analyzed in 8.3.1.1.2 to determine if the height stays below 24 inches. After n+2 frames, if this is still the case, the event is defined as a fall. It should be noted that the absolute height of 24" in arbitrary and presented here only as a representative example. A relative height, a percentage, or other appropriate means could also be used.

8.3.2 determines if a figure has sat down in the frame. This occurs in a way similar to a fall except step 8.3.2.1 first tests to assure the figure is >48" (if it isn't, 8.3.2.2 continues) then 8.3.2.3 tests to see if the maximum value is subsequently less than 48" but more than 24"; if this is the case it is determined that someone went from a standing to a sitting event.

Similar to 8.3.2, 8.3.3 determines if there is a transition from sitting to standing. Test 8.3.3.1 determines if the figure is between 24 and 48" tall in frame n, then 8.3.3.3 determines if the figure becomes >48" tall; if this is the case, it is concluded that the figure has moved from a sitting to a standing event.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Modifications and substitutions by one of ordinary skill in the art are considered to be within the scope of the present invention, which is not to be limited except by the allowed claims and their legal equivalents.

The invention claimed is:

1. A system for detecting and determining predetermined conditions related to a human occupant in a predetermined space, the system comprising:
   one or more microphones, configured for receiving non-human articulated sounds and a lack of non-human articulated sounds from within said predetermined space, and for transmitting said received non-human articulated sounds and said lack of non-human articulated sounds to a received sound processor; and
   a received sound processor, responsive to said received non-human articulated sounds and said lack of non-human articulated sounds, and configured for determining, based on said received non-human articulated sounds and said lack of non-human articulated sounds, at least one predetermined condition related to said human occupant in said predetermined space, and wherein said received sound processor is configured for storing said received non-human articulated sounds and said lack of non-human articulated sounds, and wherein said received sound processor is further configured for comparing currently received non-human articulated sounds with previously stored received non-human articulated sounds from within said predetermined space, for making said determination related to at least one predetermined condition related to said human occupant in said predetermined space.

2. The system of claim 1, wherein said received sound processor is configured for associating said received non-human articulated sounds with one or more specific machine generated sound activities, and wherein said previously stored received non-human articulated sounds includes one or more specific machine generated sounds, and wherein said currently received non-human articulated sounds includes non-human articulated sounds or the absence of non-human articulated sounds related to at least one of said one or more specific machine generated sounds, and wherein said received sound processor compares said non-human articulated sounds or the absence of non-human articulated sounds related to at least one or more of said specific machine generated sounds with previously stored received non-human articulated sounds related to said at least one or more of said specific machine generated sounds for determining said at least one predetermined condition related to said human occupant in said predetermined space.

3. The system of claim 1, wherein said non-human articulated sounds is selected from the group of non-human articulated sounds consisting of: toilet flushes, water running, smoke alarm signals, intrusion alarm signals, doorbell sounds, microwave oven beeps, telephone rings, TV sounds, computer related sounds, computer keyboard keystrokes and computer generated audible sounds.

4. The system of claim 1, wherein said system further includes a sensor system configured for detecting events, said sensor system comprising:
   an imager configured for capturing an image in said predetermined space;
   a range-finder, configured for determining the distance of objects in said predetermined space from the imager;
   an image processor, said image processor configured to:
      receive the outputs of the imager and range-finder;
      calibrate the image based on a predetermined calibration factor;
      analyze the calibrated image to determine if certain predetermined events have occurred; and
      generate an output indicative of the pattern match; and
   a transmit device, configured for transmitting the output of the image processor.

5. The system of claim 4, wherein the imager is selected from the group of elements including a camera, and infrared imager, a thermal energy imager, a thermopile, a pyroelectric infrared (PIR) element.

6. The system of claim 4, wherein the range-finder is selected from the group of rangefinders including a radiofrequency (RF) rangefinder and an optical rangefinder.

7. The system of claim 4, wherein the calibration factor is one of a mathematical equation, a look up table and a matrix.

8. The system of claim 4, wherein the event is selected from the group of events consisting of human activity, a fall, a human getting in and out of bed, a human sitting down, a human standing up, the presence of multiple people in said predetermined space, and the push of a button.

9. The system of claim 4, wherein said output of said image processor is selected from the group of outputs consisting of a wireless output, a Wi-Fi output, a cellular output, a Bluetooth output, a wired output, an ethernet output, a low-voltage alarm output, a nurse call output, a visible light output and an audible alarm output.

10. The system of claim 1, wherein the system includes a microphone and a speaker to enable two-way voice communications to and from said human occupant in said predetermined space.

11. The system of claim 1, wherein said received sound processor is configured to provide an output signal.

12. The system of claim 11, wherein said output signal from said received sound processor is coupled to a speaker in said predetermined space to enable two-way communications to and from a human in said predetermined space.

13. A system for detecting sound events in a predetermined space comprising:
- at least one microphone, configured for sensing non-human articulated sound signals from within a predetermined space, and for providing an output responsive to said sensing of said non-human articulated sound signals; at least one speaker, configured for playing received sound signals; and
- a processor, coupled to said at least one microphone and said at least one speaker, and programmed to receive said output from said at least one microphone, and responsive to said received output, for analyzing electrical signals representative of received microphone sounds of non-human articulated sound signals to determine if patterns of said received non-human articulated sound signals match certain predetermined sound signal patterns, and responsive to said analyzing and determining, said processor configured for generating an output indicative of the match between said received non-human articulated sound signals and said certain predetermined sound signal patterns, and responsive to received sound signals from outside said predetermined space in response to said processor generated output indicative of a match between said received non-human articulated sound signals and said certain predetermined sound signal patterns, for generating sound signals to be played by said at least one speaker;
- a transmitting device, coupled to said processor, and configured for transmitting the output of the processor to a remote device at a remote location; and
- a receiving device, coupled to said processor, and configured for receiving data from said remote device at said remote location, and for providing said received data to said processor for conversion into received sound signals.

14. The system of claim 13, wherein the received non-human articulated sound signals are selected from the group of sound signals consisting of non-human articulated voice sounds signals, radio sound signals, television sound signals, telephone ringing sound signals, home appliance sound signals, smoke detector sound signals, intrusion alarm sound signals, medical devices sound signals, running water sound signals and alarm clock sound signals.

15. A system for detecting and determining predetermined conditions related to a human occupant in a predetermined space, the system comprising:
- one or more microphones, configured for receiving non-human articulated current sounds from within said predetermined space, and for transmitting said received non-human articulated current sounds to a received sound processor, wherein said received non-human articulated current sounds from said predetermined space includes the presence or absence of at least one of non-human articulated sounds and specific machine generated sounds received from within said predetermined space; and
- wherein said received sound processor is configured for storing said received non-human articulated current sounds into a received sound database, said received sound processor further configured for associating received specific machine generated sounds with one or more specific machine generated sound activities stored in said received sound database, and wherein said received sound processor is configured for comparing said received specific machine generated sounds associated with said one or more specific machine generated sound activities with said one or more specific machine generated sound activities stored in said received sound database, for determining at least one predetermined condition related to said human occupant in said predetermined space.

16. The system of claim 15 wherein said one or more specific machine generated sound activities is selected from the group of sound activities consisting of toilet flushes, water running, smoke alarm signals, intrusion alarm signals, an alarm clock, appliance sounds, medical device sounds, doorbell sounds, microwave oven beeps, telephone rings, TV sounds, radio sounds, computer related sounds, computer keyboard keystrokes and computer audible sounds.

* * * * *